United States Patent [19]

Inaniwa et al.

[11] Patent Number: 4,609,861

[45] Date of Patent: Sep. 2, 1986

[54] CIRCUIT ARRANGEMENT FOR RAPIDLY CHARGING A BATTERY

[75] Inventors: Masahiro Inaniwa; Shun Suzuki; Yoichi Ogawa, all of Katsuta, Japan

[73] Assignee: Hitachi Koki Company, Limited, Tokyo, Japan

[21] Appl. No.: 673,059

[22] Filed: Nov. 19, 1984

[30] Foreign Application Priority Data

Aug. 31, 1984 [JP] Japan .................. 59-183372

[51] Int. Cl.[4] .............................................. H02J 7/04
[52] U.S. Cl. ...................................... 320/32; 320/23; 320/35; 320/39
[58] Field of Search ....................... 320/20, 22, 23, 24, 320/31, 32, 35, 36, 39

[56] References Cited

U.S. PATENT DOCUMENTS 3,864,617  2/1975  Smith et al. ............................ 320/23

OTHER PUBLICATIONS

National Technical Report, vol. 27, No. 6, Dec. 1981, "Quick Charging Systems for Sealed Rechargeable Batteries", by Yoneji Koyama et al, pp. 144–152.

Primary Examiner—Patrick R. Salce
Assistant Examiner—Anita M. Ault
Attorney, Agent, or Firm—Pollock, VandeSande & Priddy

[57] ABSTRACT

A quick battery charger according to the present invention comprises a circuit for detecting the voltage of the battery (3), a constant-current charging circuit, a constant-voltage charging circuit, and a timer circuit responsive to the voltage detecting circuit. At the beginning in charging operation, the battery is charged at a constant current, and when the voltage of the battery exceeds a predetermined value, charging mode is changed to constant-voltage charging which last for a predetermined period of time determined by the timer circuit. The charger may also comprise a trickle charge circuit so that trickle charge takes place after the constant-voltage charge. One or more heat-sensitive elements (5, 6, 69) may be used for providing temperature compensation or fail-safe in response to the heat from the battery and heat from parts of the battery charger. As a timer may be used a capacitor (50) which may be forcibly charged to insure a given period of time of the constant-voltage charging. A differential amplifier (42) may be used for detecting the voltage of the battery so that a power transistor (13) used as an element of the constant-current charging circuit is controlled in response to an output signal from the differential amplifier (42) to perform constant-voltage charging.

12 Claims, 11 Drawing Figures

CIRCUIT ARRANGEMENT FOR RAPIDLY CHARGING A BATTERY

BACKGROUND OF THE INVENTION

This invention relates generally to charging circuits used for charging lead-acid storage batteries, and more particularly to a circuit arrangement of a quick charger for lead-acid storage batteries of sealed type.

Lead-acid storage batteries of sealed type are advantageous for powered tools having no power cable because energy density is high when discharging characteristic is considered and because of inexpensive cost when compared with other secondary batteries such as nickel-cadmium batteries.

As is well known in the art, it is somewhat difficult to handle lead-acid batteries of sealed type, however, compared with lead-acid batteries of open type such as those used for automobiles, because sealed type batteries should not be overcharged for electrolyte thereof is apt to be insufficient due to overcharging. Furthermore, insufficient charging should also be avoided to derive desired power from such a sealed type battery. Such undesirable ways of charging, i.e. overcharging and insufficient charging, shorten the life of lead-acid batteries of sealed type. In order to meet such requirement in charging therefore, lead-acid batteries of sealed type have been subjected to so called long-time charging in which a battery is charged for 15 hours or so, so as to charge the same in an ideal manner without suffering from overcharge or insufficient charge. It is also known in the art that an ideal charging state corresponds to 105% of a previously discharged amount.

However, such a long-time charging is not practical for powered tools because powered tools, such as electric drills, are desired to be used again with a relatively short period of time for battery charging. A quick charging system for powered tools was developed recently, and known in the art. This prior art is disclosed in National Technical Report Vol. 27. No. 6, published December 1981 by Matsushita Electric Industry Co. Ltd., under a title of Small Sealed type Secondary Battery Quick Charge System written by Yoneji Koyama et al. According to this known system, a programmed time limit constant-current charging mode follows a normal constant-current charging mode, and after the programmed time limit constant-current charging mode, a trickle charging mode takes place. In the programmed time limit constant-current charging mode, the charging current is stepwise reduced successive so as to forcibly charge a battery by injecting a predetermined amount of charge irrespective of the amount of charge achieved by the former normal constant-charging mode. Although this quick charge system provides a less charging period, since the charging amount at the instant of transition from the constant-current charging mode to the programmed time limit constant-current charging mode is not necessarily constant, this system is apt to suffer from overcharge and/or insufficient charge.

SUMMARY OF THE INVENTION

The present invention has been developed in order to remove the above-descrited drawbacks inherent to the conventional charging apparatus or circuits used for lead-acid batteries of sealed type.

It is, therefore, an object of the present invention to provide a new and useful quick charger for use with a lead-acid battery of sealed type so that charging is effected without suffering from overcharge or insufficient charge.

According to a feature of the present invention after normal constant-current charging is effected until the voltage of the battery reaches a predetermined voltage, constant-voltage charging is effected for a predetermined period of time so that charging is effectively completed within a short period of time while electrolyte of the battery is prevented from being wasted due to overcharge. To achieve this feature therefore, a constant-voltage charging circuit including a timer circuit is used. The duration of the constant-voltage charging may be fixed or variable.

According to another feature of the present invention a transistor is provided for by-passing base current of a power transistor through which charging of the battery is performed so that the battery charger is prevented from breaking down or malfunctioning when being applied to a battery which is internally short circuited.

According to a further feature of the present invention the circuit arrangement for effecting battery charging is connected to the battery via a switching circuit which is responsive to d.c. power used for battery charging so that the battery is prevented from discharging even if the battery is left connected to the charger which is disconnected from an a.c. power source. In conventional circuit arrangements, since diodes are interposed between the battery and a charger for preventing undesirable discharge of the battery, accurate voltage detection of the voltage of the battery cannot be made due to the presence of such diodes. However, according to the present invention since the circuit arrangement is isolated from the battery by way of a switching circuit, the battery is effectively prevented from discharging while accurate voltage detection is insured.

According to a further feature of the present invention temperature compensation is effected such that a heat-sensitive element is placed so as to receive heat from the battery and some parts of the battery charger so that charging is effectively controlled while charging time is reduced.

According to a further feature of the present invention an indicator element is responsive to a voltage difference between two capacitors which are respectively connected to first and second rectifying circuits one of which is used for charging the battery so that a user can readily ascertain whether the battery has been fully charged or not.

In accordance with the present invention there is provided a circuit arrangement for rapidly charging a battery, comprising: first means for detecting the voltage of said battery to be charged and producing a signal indicating the relationship between said voltage and a predetermined voltage; a constant-current charging circuit responsive to said signal from said first means for supplying said battery with a constant-current from a d.c. power source until said voltage reaches said predetermined voltage; a constant-voltage charging circuit responsive to said signal from said first means for supplying said battery with a constant voltage from said d.c. power source for a predetermined period of time; and a timer means responsive to said signal from said first means for providing said predetermined period of time to said constant-voltage charging circuit.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
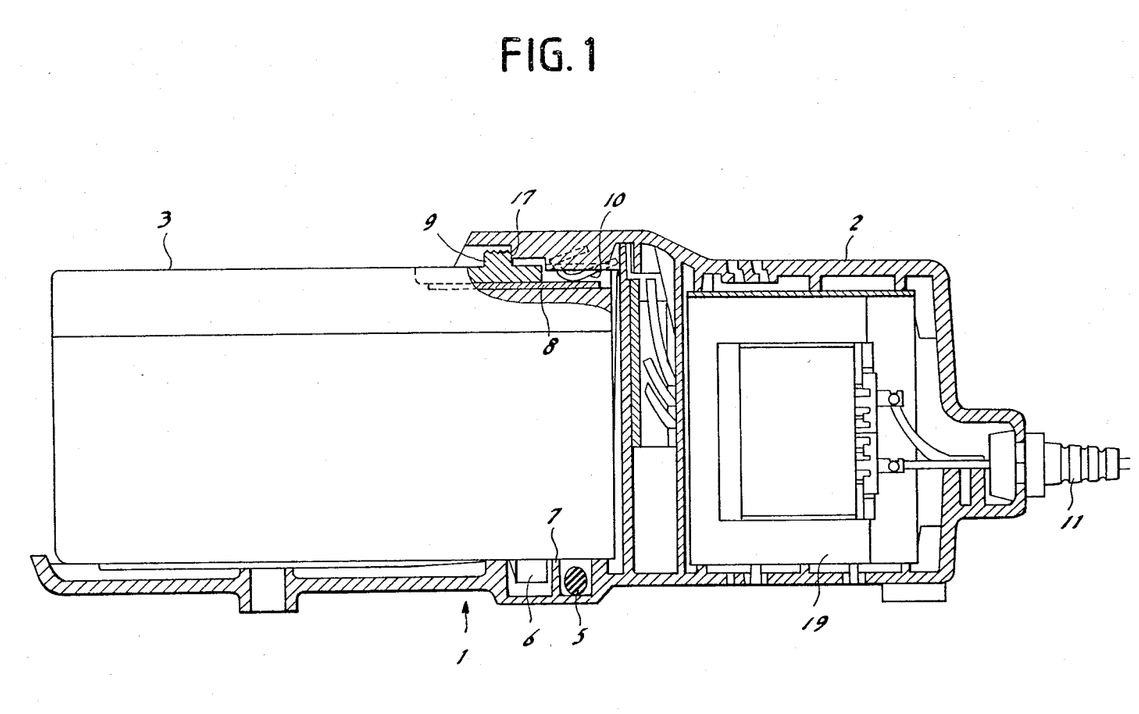
FIG. 1 is a schematic cross sectional view of a quick battery charger according to the present invention and a battery to be charged by the charger.

Referring now to FIG. 1, an embodiment of a quick charger according to the present invention is shown together with a lead-acid battery of sealed type, which will be simply referred to as a battery hereinafter. In FIG. 1, the reference 1 generally designates the quick charger; 2, a casing; 3, the above-mentioned battery; 19, a transformer; and 5, a heat-sensitive resistor which detects the temperature of the battery 3 at the bottom thereof. The reference 6 is a heat-sensitive switch which turns from closed state to open state when the temperature of the battery 3 abnormally rises. The reference 7 is a thin metallic plate in intimate contact with the casing 2, and interposed between the bottom of the battery 3 and the heat-sensitive elements 5 and 6. The metallic plate 7 effectively conducts heat from the battery 3 to the heat-sensitive elements 5 and 6. The reference 8 indicates terminals of the battery 3, and the reference 9 is a safety cover which is slidable along the terminal 8. The reference 10 indicates supply terminals of the charger 1, which supply terminals are in contact with the terminals 8 of the battery 3. The reference 11 is a power source cable capable of being connected to an unshown a.c. power source.

Figure 2:
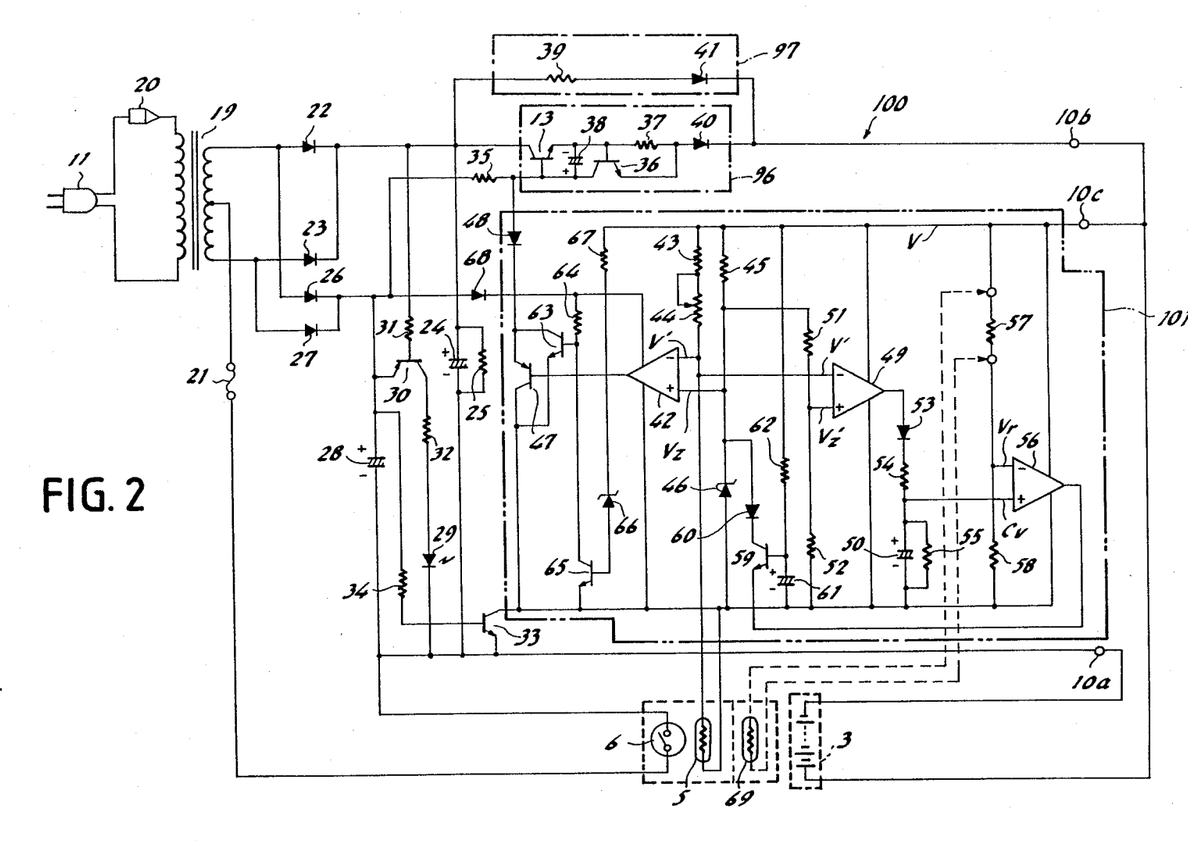
FIG. 2 is a circuit diagram of a first embodiment circuit arrangement for rapidly charging a battery according to the present invention.

FIG. 2 shows a circuit diagram of a first embodiment of the quick charger according to the present invention. The quick charger, which is generally designated at 100, comprises various circuits as follows. In detail, the reference 19 is the voltage-reducing transformer shown in FIG. 1; 20, a temperature fuse which is embedded in the primary winding of the transformer 19 and is arranged to be molten to cut off the primary winding circuit when the temperature of the transformer 19 abnormally rises; 21, a current-fuse connected to a center tap of the secondary winding of the transformer 19 for cutting off overcurrent; 22 and 23, diodes for rectifying the secondary output from the transformer 19. The diodes 22 and 23 forming a main d.c. power supply are connected to a power transistor 13 which constitute a constant-current charging circuit together with another transistor 36, a capacitor 38, a resistor 37, and a diode 40. The constant-current circuit is indicated at a reference 96, and is connected in series with a positive terminal of the battery 3 via a terminal 10b. A center tap of the transformer 19 is connected via a series circuit of the current fuse 21 and the heat-sensitive switch 6 and via the terminal 10b to a negative terminal of the battery 3. The reference 24 is a first capacitor used as a smoothing capacitor for the charging circuit, and the reference 25 is a discharging resistor connected in parallel to the the first capacitor 24. The references 26 and 27 are diodes which rectify the secondary output of the transformer 19 so as to form another d.c. power source circuit separately from the charging circuit of the battery 3. The reference 28 is a second capacitor used as a smoothing capacitor; 29, a charging-indicating lamp made of a light-emitting diode (LED); 30, a transistor for controlling the LED 29; 31, a resistor for limiting the base current of the transistor 30; 32, a resistor for limiting a forward current of the LED 29. The LED 29 is arranged to emit light with base current being fed to the transistor 31 when the charging voltage across the second capacitor 28 is higher than the charging voltage across the first capacitor 24. The reference 33 is a transistor driven by the charging voltage across the second capacitor 28; 34, a resistor for limiting base current of the transistor 33. The transistor 33 prevents the battery 3 from being discharged via a voltage-detecting terminal 10c when the charge-controlling circuit 100 is in nonoperating state with the power source cable 11 being disconnected from an unshown a.c. power source. The reference 35 is a resistor which supplies base current to the power transistor 13; 37, a reference resistor inserted into the charging circuit of the battery for detecting charging current flowing therethrough; 38, a capacitor for preventing oscillation resulting from unstable constant-current control. The reference 39 is a resistor for effecting trickle charge, and 40, 41 are diodes for blocking reverse currents. The series circuit of the resistor 39 and the diode 41, which series circuit is connected in parallel to the constant-charge circuit 96 is indicated at the reference 97.

A time limit constant-voltage control circuit is generally designated at the reference 101, in which the reference 42 is a differential amplifier which controls base current of the power transistor 13 and supplies the battery 3 with a constant voltage, and may be an operational amplifier as shown. The references 43 and 44 are a fixed resistor and a semi-fixed resistor respectively which are connected in series together with the heat-sensitive resistor 5 to form a series circuit which series circuit is connected in parallel with the battery 3 via the transistor 33. The series circuit forms a voltage divider so as to supply an inverting input (−) of the operational amplifier 42 with a voltage V' obtained by dividing the charging voltage. A resistor 45 and a zener diode 46 form a series circuit in a similar manner so as to provide a reference voltage $V_2$ to an inverting input (+) of the operational amplifier 42. The reference 47 is a transistor whose base is connected to an output terminal of the operational amplifier 42, and this transistor 47 controls the base current to the power transistor 13 through a diode 48 used for preventing reverse current. The reference 49 is a comparator which controls charging state of a capacitor 50 which will be referred to as a timer capacitor since the voltage across the capacitor 50 will determine a duration provided by a timer as will be described hereinafter. The references 51 and 52 are resistors connected in series to form a voltage divider, which is connected in parallel to the zener diode 46. A junction between the resistors 51 and 52 is connected to a noninverting input (+) of the comparator 49 so as to supply the same with a reference voltage Vz' obtained by dividing the voltage across the zener diode 46. An inverting input (−) of the comparator 49 is connected to the inverting input (−) of the operational amplifier 42. The reference 53 is a diode for preventing reverse current; 54, a resistor for limiting charging current to the capacitor 50; and 55, a charging resistor for the capacitor 50.

The reference 56 is a comparator which lowers the voltage at the noninverting input (+) of the operational amplifier 42 by short-circuiting both terminals of the zener diode 46 when time is up. More specifically, the comparator 56 as well as the timer capacitor 50 and peripheral elements constitute a timer circuit which provides a predetermined period of time so that the time-limit constant-voltage control circuit 101 performs constant voltage charging for the predetermined period of time. An inverting input terminal (−) of the comparator 56 is connected to a junction between resistors 57 and 58, which are connected in series, so as to receive a reference voltage Vr obtained by dividing the charging voltage to the battery 3. A noninverting input (+) of the comparator 56 is arranged to receive the voltage Cv across the timer capacitor 50. The reference 59 is a transistor which is connected between the cathode of the zener diode 46 and the output terminal of the comparator 56 for making a short-circuit for the zener diode 46 when the output of the comparator 56 is 0V. The reference 60 is a diode for preventing reverse current; 61, a capacitor for integrating the base voltage of the transistor 59 so as to prevent the transistor 59 from being driven at the time the charge-control circuit 100 starts operating. The reference 62 is a resistor for supplying base current to the transistor 59.

The reference 63 is a transistor which prevents power supply to the battery 3 by maintaining the power transistor 13 in nonconductive state with the base current of the transistor 13 being bypassed, when the voltage of the battery 3 is abnormally low. The reference 64 is a resistor for supplying base current to the transistor 63; 65, a transistor for controlling the base current to the transistor 63. The reference 66 is a zener diode which detects the charging voltage of the battery 3 and controls the transistor 65; 67, a resistor; and 68, a diode for preventing reverse current.

The battery 3 to be charged is connected to the charger via terminals 10a, 10b and 10c, which are simply represented by the reference 10 in FIG. 1, as shown. As will be described in detail hereinbelow, when the power supply cable is connected to a.c. power source, charging of the battery 3 is started such that constant-current charging is first performed at an initial period, and then time-limit constant-voltage charging is performed. As a result, the battery 3 is completely charged within a short period of time, and then trickle charge takes place so that charging by way of continuous small current lasts. The above-mentioned constant-current charging is performed from time $T_0$ to $T_2$ in FIG. 3, the time-limit constant-voltage charging corresponding to duration from $T_2$ to $T_4$; and the trickle charge corresponding to a duration after $T_4$.

Turning back to FIG. 2, at the beginning of charging, base current flows into the transistor 33 so as to lower the voltage across the collector and emitter of the same. As a result, the collector voltage of the transistor 33 equals the voltage at the negative terminal of the battery 3. Therefore, a voltage obtained by dividing an accurate charging voltage of the battery 3 is fed to the inverting input (−) of the operational amplifier 42. Simultaneously, the operational amplifier 42 and the comparators 49 and 56 are supplied with power so that the charging control circuit 100 starts operating.

At the beginning of charging the above-mentioned constant-current charging is performed such that charging is rapidly effected through the power transistor 13 and the reference resistor 37 until the charging voltage V of the battery 3 reaches a first predetermined voltage $V_0$. At this time, the voltage V' at the inverting input (−) of the operational amplifier 42 obtained by dividing the charging voltage V of the battery 3 has a relationship of V'<Vz with the zener voltage Vz across the zener diode 46. Therefore, the operational amplifier 42 produces an output voltage which is substantially the same as the driving voltage fed thereto, and thus the transistor 47 is maintained in cutoff state. The voltage Vz' fed to the noninverting input (−) of the comparator 49 is slightly lower than the zener voltage Vz because the zener voltage Vz is divided. Since the voltage Vz' has a relationship of V'<Vz' with the reference voltage V', the comparator 49 also produced a high level output, thereby the capacitor 50 is charged such that the charging voltage Cv across the capacitor 50 rises to the output voltage from the comparator 49 at a rate determined by a time constant which is defined by the values of the capacitor 50 and the resistor 54.

As charging progresses so that the charging voltage V of the battery 3 reaches the first predetermined voltage $V_0$, it leads to V'=Vz' causing the output signal from the comparator 49 to be inverted to assume 0V. As a result, the timer capacitor 50 starts discharging through the resistor 55 connected thereacross, and therefore the charging voltage Cv across the capacitor 50 gradually lowers (see time T1 in FIG. 3). At this time, since input signal levels of the operational amplifier 42 still have the relationship of V'<Vz, the transistor 47 is still kept in cutoff state, and therefore a rapid constant-current charging of the battery 3 is further effected for a short period of time. When the charging voltage V of the battery 3 reaches the first predetermined voltage $V_1$, then V' equals Vz so that the voltage at the output terminal of the operational amplifier 42 becomes low allowing the transistor 47 to be conductive. As a result, the power transistor 13 starts performing constant-voltage charging for the battery 3, and a charging current I then reduces gradually thereafter from T2 in FIG. 3.

Figure 3:
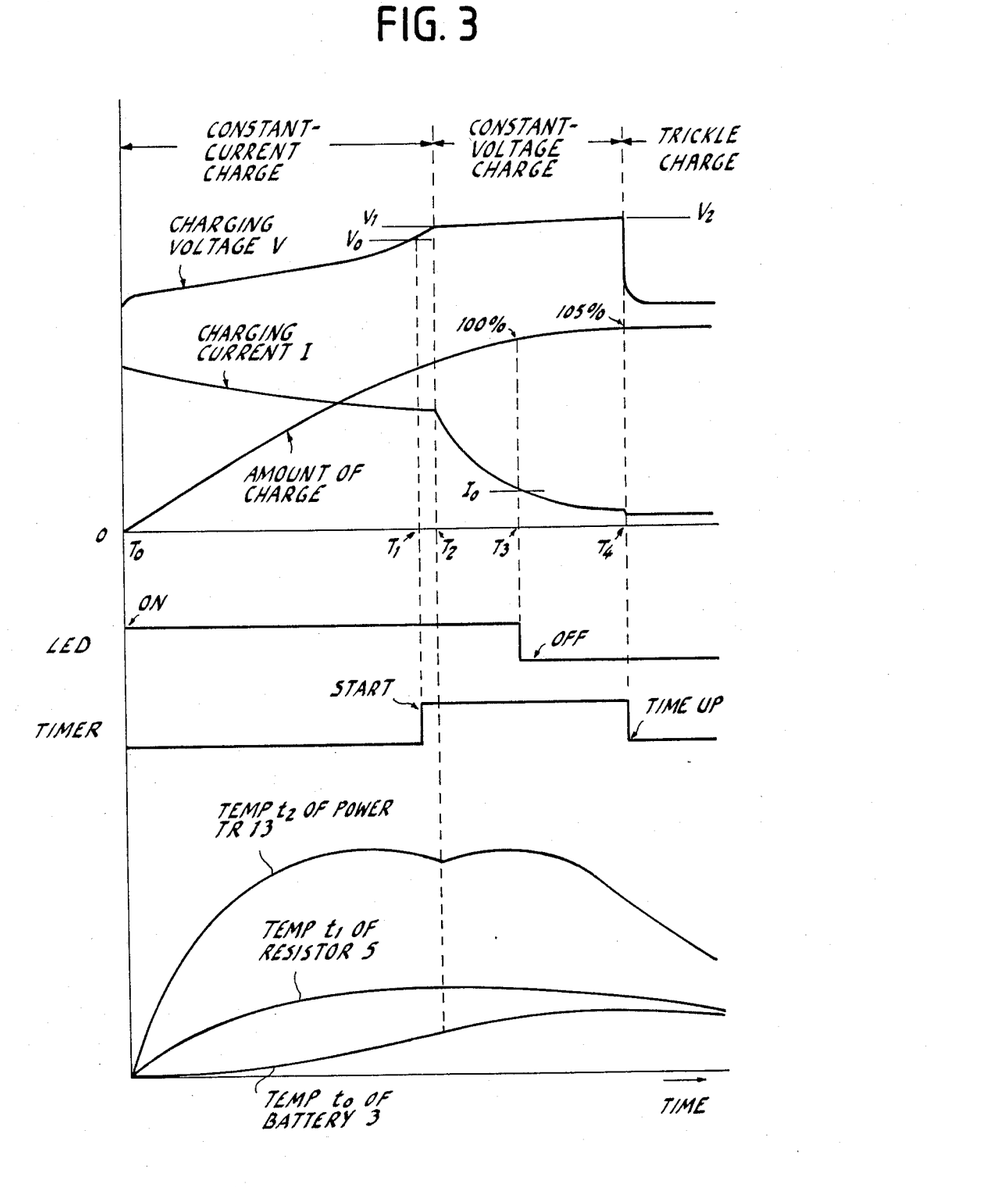
FIGS. 3 and 4 are graphs useful for understanding the operation of the first embodiment circuit of FIG. 2.

At the time T3 where the charging amount for the battery 3 exceeds approximately 100 percent of the previous discharging amount, the charging current I lowers to a value $I_0$. Then, a ripple voltage across the first smoothing capacitor 24 rises to approach the voltage across the second capacitor 28 and these voltages become equal to each other. Therefore, the base current to the transistor 30 disappears causing the transistor 30 to be in cutoff state which results in deenergization of the LED 29. A user of the charger may ascertain the charging state of the battery 3 from the deenergized LED 29.

When the charging amount for the battery 3 exceeds approximately 105% of the previous discharging amount so that complete charging will be terminated at time T4, the voltage Cv across the timer capacitor 50 becomes lower than the voltage at the inverting input terminal (−) of the comparator 56. Thus, the output voltage from the comparator 56 is inverted from high level to 0V lowering the emitter voltage of the transistor 59. As a result, the transistor 59 turns to conductive state making a short circuit for the zener diode 46. Therefore, the operational amplifier 42 produces an output of 0 V which causes the power transistor 13 to be in cutoff state. As a result, a charging current flows only through the resistor 39 and the diode 41 to the battery 3 so as to perform trickle charge.

In the above-described operation, the voltages $V_0$, $V_1$ and the charging voltage $V_2$ at an ending period respectively assume suitable values because the heat-sensitive resistor 5 having a positive resistance-temperature characteristic is provided at the bottom of the battery as seen in FIG. 1. More specifically, voltages $V_0$, $V_1$ and $V_2$ are automatically corrected to higher values when the temperature of the battery 3 is low, and to lower values when the temperature of the same is high. Therefore, complete charging may be possible under any temperature. The temperature compensation effected by the heat-sensitive resistor 5 may be set to approximately −5.5 mV/°C. per one cell of the battery 3.

The change in temperature of the battery 3 at its bottom is shown in FIG. 3 with the reference $t_0$, while the temperature of the heat-sensitive resistor 5 is also shown with the reference $t_1$. Furthermore, the temperature of the power transistor 13 is also shown with the reference $t_2$. As will be understood from the relationship between these temperatures, it is to be noted that the temperature $t_1$ of the heat-sensitive resistor 5 becomes higher than that $t_0$ of the bottom of the battery 3 because heat generated by the power transistor 13 and other parts is transmitted to the heat-sensitive resistor 5 in addition to the heat from the battery 3 to the same. As a result, the voltages $V_0$ and $V_1$ are made lower so as to prevent thermal runaway of the battery 3, which is apt to occur due to insufficient charging voltage rise, since the charging control circuit 100 can securely provide the constant-voltage control even if the charging voltage is difficult to rise because the battery 3 is situated in a high-temperature place and the battery 3 is in the last stage of its life where the elecrolyte has been reduced.

In the ending period of the battery charging, since the charging current I decreases because of the constant-voltage control, the heat generated by the transistor 13 is reduced accordingly. Therefore, the temperature $t_0$ of the heat-sensitive resistor 5 lowers to a value which is approximately equal to the temperature $t_0$ at the bottom of the battery 3. As a result, the charging voltage gradually rises in the middle of the constant-voltage charging so that the charging voltage $V_2$ at the end period becomes higher than the predetermined voltage $V_1$. With this operation it is now possible to reduce the time required for completing the charging of the battery 3.

Other functions of the charge-control circuit 100 will be described. During trickle charge which takes place after the completion of the constant-voltage charging, let us assume that the voltage of the a.c. power source has dropped instantaneously for some reason such as a starting of other machine powered from the same a.c. power source as that used for the present charger. Even if such voltage drop has occurred, since the base current to the transistor 33 is continuously fed from the charges of the capacitor 28, the charging control circuit 100 is not reset to the constant-current charging mode. Therefore, undesirable overcharge of the battery 3 due to disturbance can be effectively prevented.

Let us assume that the battery 3 to be charged is in trouble such that terminals thereof are internally short-circuited. In this case, since a normal voltage does not appear between the terminals 10a and 10c, the zener diode 66 is not conductive. As a result, the transistor 65 is maintained in cutoff state while the transistor 63 is held conductive, and therefore, the base current of the power transistor 13 is bypassed by the transistor 63. For this reason, the charge-controlling circuit 100 does not start the rapid charging under this condition thereby preventing the occurrence of the abnormal heat generation of the power transistor 13 preventing breakdown or malfunction of the charge-controlling circuit 100 due to application of a short-circuited battery.

Furthermore, in case of abnormal temperature rise due to overcharge of the battery 3, which is resulted from breakdown of one or more parts of the charge-controlling circuit 100, the heat-sensitive switch 6 attached to the bottom of the battery 3 as seen in FIG. 1 is made open. As a result, charging is interrupted, and therefore undesirable phenomena, such as thermal deformation of the battery 3, leakage of the electrolyte to outside the battery casing, occurrence of fire or the like can be effectively and securely prevented.

Figure 4:
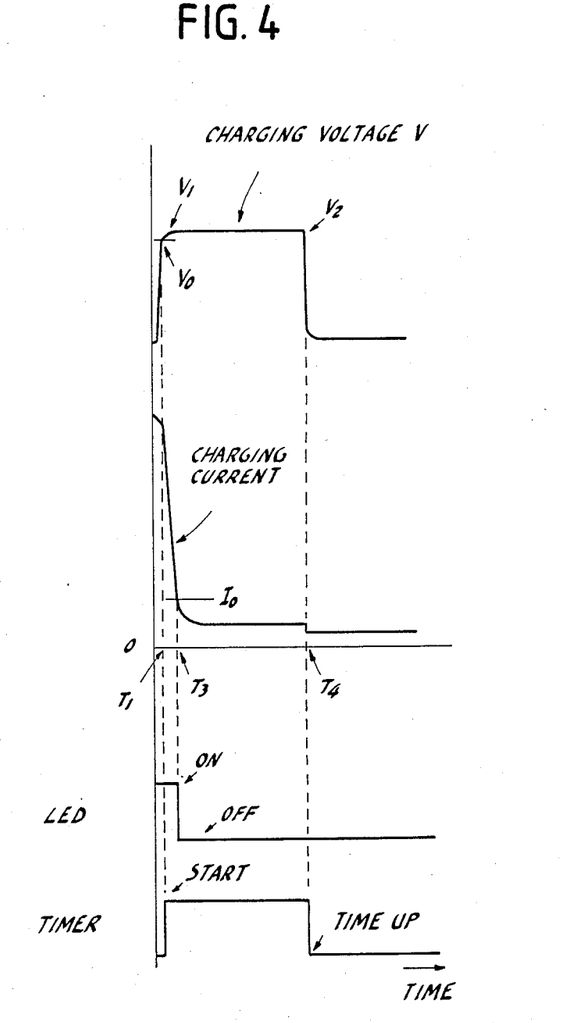

Reference is now made to FIG. 4 for the description of the way of charging when the battery 3 has already been fully charged. When such a fully charged battery 3 is subjected to charging, the charging voltage V immediately rises after the start of charging. Therefore, the charge-controlling circuit 100 is put in the time-limit constant-voltage charging mode immediately. At this time, the charging current I also decreases suddenly to a value which is below $I_0$, and therefore the LED 29 is deenergized after energization of the same once. Watching this state, the user can readily recognize that the battery 3 is in fully charged state and therefore can start operating the power tool using the battery 3. In the case of such a fully charged battery 3, since the output voltage from the comparator 49 is inverted to 0 V within a short period of time, the timer capacitor 50 starts discharging in the middle of charging the same. As a result, the duration of the time-limit constant-voltage charging is shortened preventing excessive charging of the battery 3.

In the above-described embodiment, the reference voltage Vr to be compared with the voltage Cv across the timer capacitor 50 by way of the comparator 56 is obtained by simply dividing the charging voltage of the battery 3 by two fixed resistors 57 and 58 so that the reference is not changed by the temperature of the battery 3. However, batteries usually have a temperature-dependent characteristic such that higher the temperature, shorter the required charging time. Therefore, the fixed resistor 57 may be replaced with a heat-sensitive resistor 69 having a negative resistance-temperature characteristic, where the heat-sensitivve resistor 69 is placed around the heat-sensitive resistor 5 or the heat-sensitive switch 6 to be responsive to the temperature of the battery 3. When such a resistor 69 is used to provide the reference voltage, then the reference voltage Vr changes as a function of the battery temperature so that the duration of the constant-voltage charging is shortened when the temperature is high and lengthened when the temperature is low. With this arrangement, overcharge in high temperature state and insufficient charge in low temperature state are both effectively prevented.

Referring now to FIGS. 5 to 8, a second embodiment of the present invention will be described. The second embodiment quick charger differs from the first embodiment illustrated in FIG. 2 in that the reference voltage Vr fed to the inverting input (−) of the comparator 56 is not produced by a voltage divider but is supplied from the base of the transistor 65. Although the base of the transistor 65 is connected via a series circuit of the resistor 67 and the zener diode 66 to the positive electrode of the battery 3 in the first embodiment, the base is connected to the positive electrode of the battery via only the resistor 67 in the second embodiment. Remaining structure of the second embodiment is the same as that in the first embodiment of FIG. 2.

This second embodiment is useful for reducing charging time since constant-voltage charging is restarted if the charged state of the battery 3 is still insufficient when constant-voltage charging has finished. The inventors of the present invention noticed that the rate of lowering of the charging voltage of the battery 3 at the time of transition from the constant-voltage charging mode to the trickle charge mode is low when the battery is in a fully charged state and on the contrary, the rate of the same is high in the case of insufficient charge. Using this characteristic, the reference voltage Vr to be compared with the voltage Cv across the timer capacitor 50 is made lower than the voltage Cv across the timer capacitor 50. Then the timer capacitor 50 is recharged so as to restart the time-limiting operation. With this operation, it is now possible to lengthen the constant-voltage charging so as to reduce time required for completely charging a battery.

Figure 5:
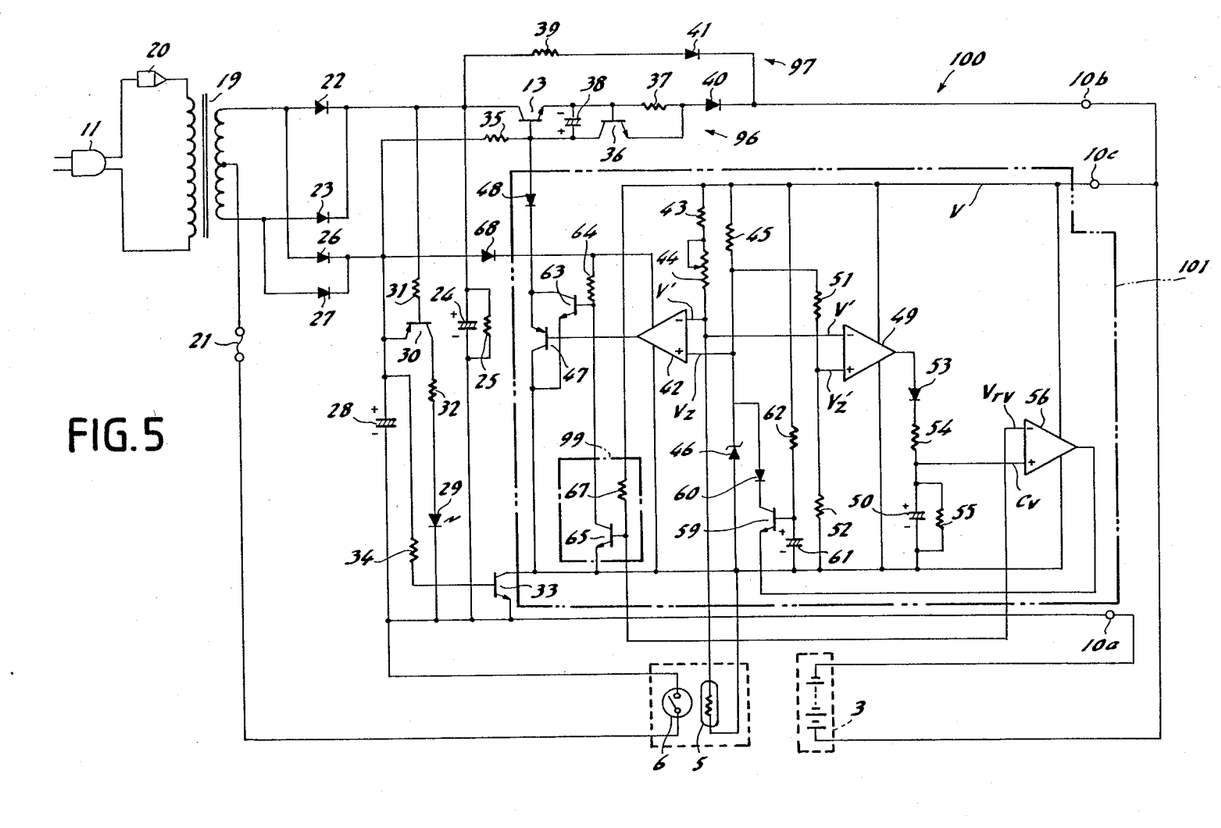
FIG. 5 is a circuit diagram of a second embodiment circuit arrangement for rapidly charging a battery according to the present invention.

In the second embodiment quick charger shown in FIG. 5, the transistor 65 and the resistor 67 form a reference voltage generator 99 which generates a variable reference voltage Vrv to be compared with the voltage Cv across the timer capacitor 50 by way of the comparator 56. More specifically a voltage between base and emitter of the transistor 65 is fed to the inverting input (−) of the comparator 56 as the above-mentioned variable reference voltage Vrv, where the base current of the transistor 65 varies in accordance with the charging voltage V of the battery 3.

Figure 6:
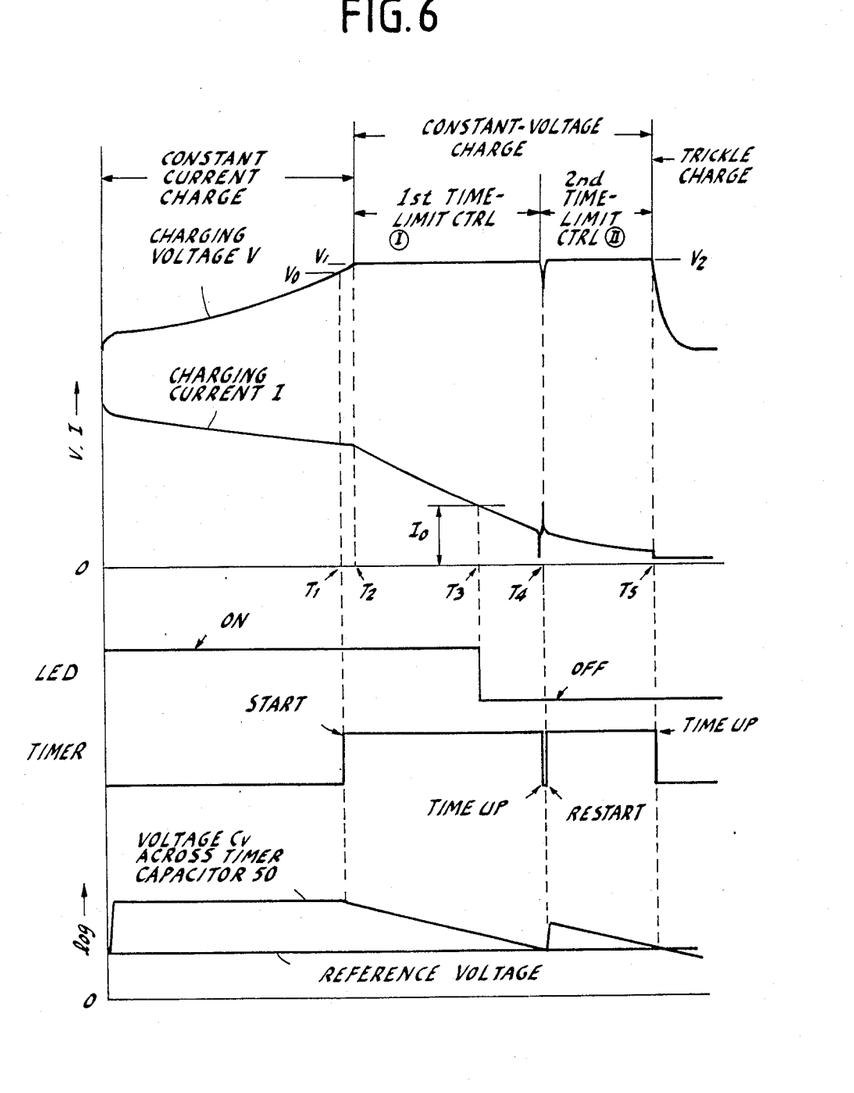
FIGS. 6 to 8 are graphs useful for understanding the operation of the second embodiment circuit of FIG. 5.
Figure 7:
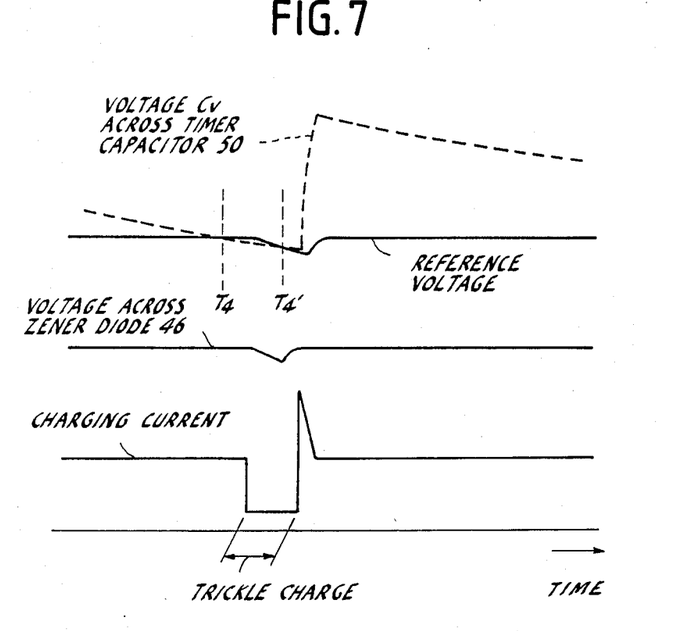

Referring now to FIGS. 6 and 7 the operation of the second embodiment quick charger will be described. In FIG. 6 which is similar to FIG. 3 showing the operation of the first embodiment, a first time-limit control ⓘ corresponds to the time-limit constant-voltage charging mode in FIG. 3.

In addition to the first time-limit control ⓘ, a second time-limit control ⓘⓘ is provided. Both of these first and second time-limit controls ⓘ and ⓘⓘ are for constant-voltage charging. In FIGS. 6 and 7, time T₄ corresponds to the end of the first time-limit control ⓘ. Although constant-voltage charging is interrupted at time T₄, when the charging characteristic of the battery 3 is poor because the temperature of the same is low, the charging amount at the end of the time-limit constant-voltage charging, i.e time T₄, is approximately 100%. Analyzing the voltage variation around T₄, FIG. 7 shows the voltage across the timer capacitor 50 around T₄. At T₄′ which immediately follows T₄, the voltage from the reference voltage generating circuit becomes lower than the voltage Cv across the timer capacitor 50. As a result, the output signal from the comparator 56 is inverted to high level, while the voltage across the zener diode 46, which is being lowered, now rises again. Therefore, the battery is instantaneously charged by way of constant-current charging until the charging voltage reaches the constant-voltage. In response to this operation the comparator 49 outputs a high level output signal for a short period of time so as to charge the timer capacitor 50. As a result, the second time-limit control ⓘⓘ is started for restarting the constant-voltage charging in which the battery 3 is again subjected to rapid charging through constant-voltage charging. The duration for the second time-limit control ⓘⓘ is made shorter than that of the first time-limit control ⓘ because of the presence of the charging resistor 54. Although it is illustrated in FIG. 6 that the second time-limit control ⓘⓘ is performed once after the first time-limit control ⓘ, the second time-limit control ⓘⓘ may be performed a plurality of times until the battery 3 is fully charged.

Figure 8:
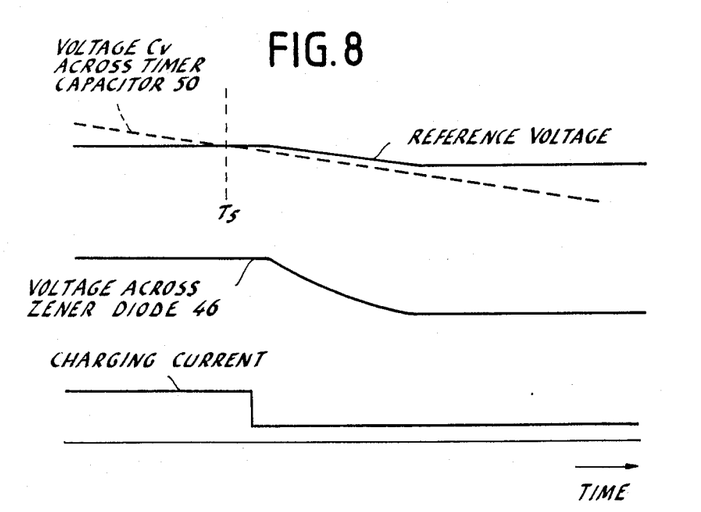

Let us assume that the battery 3 is fully charged at time T₅. Referring to FIG. 8, when the battery 3 is in such a fully charged state, the rate of lowering of the charging voltage in trickle charge is low, and therefore the voltage Vrv from the reference voltage generating circuit 99 is necessarily kept above the voltage Cv across the timer capacitor 50. Therefore, time-limit control for constant-voltage charging is not restarted under such condition.

In the above-described second embodiment, although the reference voltage generating circuit 99 is formed of the transistor 65 and the resistor 67, other arrangement may also be used. For instance, a series circuit of a resistor and a zener diode may be used so as to utilize a characteristic that a zener voltage slightly changes in accordance with the current flowing therethrough.

From the foregoing it will be understood that the second embodiment quick charger is capable of charging the battery 3 within a short period of time since time-limit control is repeatedly effected to continue constant-voltage charging as long as the battery 3 is insufficiently charged. Since the duration of the second or following time-limit control is relatively shorter than that of the first time-limit control, undesirable overcharge can also be effectively prevented. As a result long life of a storage battery is insured since electrolyte therein is not wasted due to overcharge. The reason that such a shorter period is provided is that the timer capacitor 50 is partially charged by a narrow pulse from the comparator 49 as seen in FIG. 6 (see narrow negative-going pulse at T₄ where the timer capacitor 50 is recharged partially).

Figure 9:
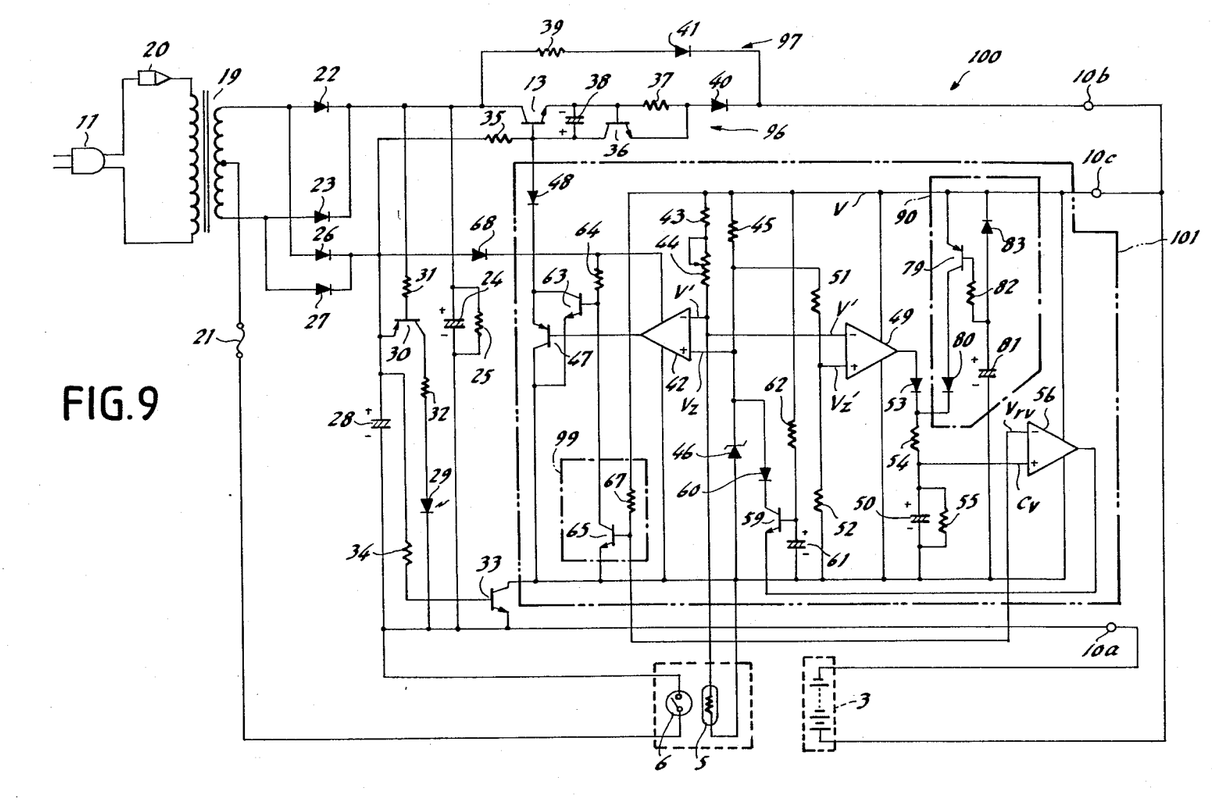
FIG. 9 is a circuit diagram of a third embodiment circuit arrangement for rapidly charging a battery according to the present invention.

Reference is now made to FIG. 9 showing a third embodiment of the present invention which corresponds to an improvement or a modification of the above-described second embodiment. The third embodiment quick charger illustrated in FIG. 9 differs from the second embodiment of FIG. 5 in that an additional capacitor-charging circuit is provided for the timer capacitor 50. In the previous first and second embodiments, the timer capacitor 50 is arranged to be charged by an output signal from the comparator 49 where the output signal is fed via a series circuit of the diode 53 and the charging resistor 54. The comparator 49 and the diode 53 may be referred to as a first capacitor-charging circuit, and in this third embodiment an additional or a second capacitor-charging circuit 90 is provided. The second capacitor-charging circuit 90 comprises a series circuit of a diode 83 and a capacitor 81, a transistor 79 whose base is connected via a resistor 82 to a junction between the diode 83 and the capacitor 81, and a diode 80 connected between collector of the transistor 79 and the resistor 54. The emitter of the transistor 79 and the cathode of the diode 83 are connected to the terminal 10c. The diode 80 is provided for preventing a reverse current, while the the capacitor 81 is provided for instantaneously driving the transistor 79 by supplying a base current via the resistor 82. The diode 83 is provided for discharging the charge of the capacitor 81 immediately. With this arrangement, the second capacitor-charging circuit 90 operates such that a current flows through the emitter-collector path of the transistor 79 via the diode 80 and the resistor 54 to the timer capacitor 50 so as to forcibly charge the same.

Figure 10A:
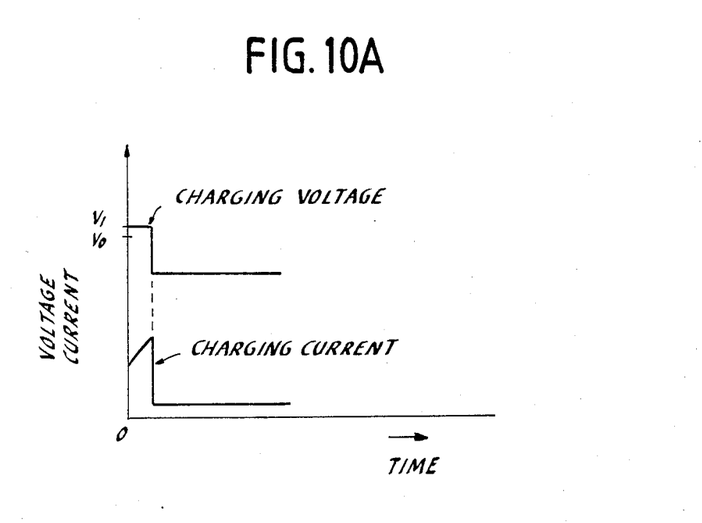
FIGS. 10A and 10B are graphs useful for understanding the operation of the third embodiment circuit of FIG. 9.

FIGS. 10A and 10B are presented for a better understanding of the operation of the third embodiment of FIG. 9. If the second capacitor-charging circuit 90 were not provided, namely, if the timer-capacitor 50 is charged by only the output signal from the comparator 52 as in the first and second embodiments, undesirable phenomenon would occur when it is intended to charge a battery which has been unused for a long period of time. More specifically, since such a battery discharged to a considerable extent has a relatively high internal resistance, the charging voltage immediately reaches the predetermined voltage $V_1$ beyond $V_0$ as seen in FIG. 10A where voltages $V_0$ and $V_1$ are the same as those in FIG. 3. Therefore, the timer capacitor 50 is charged for only a short period of time in which the output signal level from the comparator 49 is inverted from high level to low level. As a result, the duration for which the constant-voltage charging effected is extremely short. This means that the constant-voltage charging is hardly performed for such a discharged battery and trickle charge takes place.

Figure 10B:
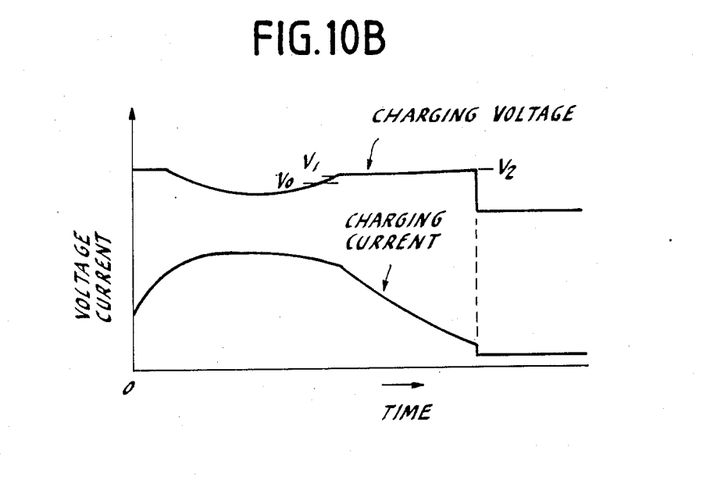

In the third embodiment, however, the timer capacitor 50 is securely charged by the second capacitor-charging circuit 90 independent of the charging by the comparator 49. More specifically, the timer capacitor 50 is forcibly charged by a current from the transistor 79 as long as the capacitor 81 is being charged by the base current of the transistor 79, so that the voltage across the timer capacitor 50 reaches the voltage across the battery 3. Therefore, as seen in FIG. 10B at an early period of charging a constant-voltage charging is once performed and as charging progresses then the charge-accepting characteristic of the battery 3 is restored and thus the charging current gradually increases so that constant-current charging takes place in place of constant-voltage charging. After this, the way of charging is similar to that shown in FIG. 3 which is for a battery having a desired charge-receiving characteristic.

Summarizing the third embodiment, since the timer-capacitor is forcibly charged irrespective of the state of the battery 3 to be charged at the beginning of battery charging, the constant-voltage charging is necessarily effected for a predetermined period of time. Therefore, even long-left batteries showing poor charge-accepting characteristic, such as a high internal resistance, can be securely charged within a short period of time.

The above-described embodiments are just examples of the present invention, and therefore, it will be apparent for those skilled in the art that many modifications and variations may be made without departing from the scope of the present invention.

What is claimed is:

1. A circuit arrangement for rapidly charging a battery, comprising:
    (a) first means for detecting the voltage of said battery to be charged and producing a signal indicating the relationship between said voltage and a predetermined voltage;
    (b) a constant-current charging circuit responsive to said signal from said first means for supplying said battery with a constant-current from a d.c. power source until said voltage reaches said predetermined voltage;
    (c) a constant-voltage charging circuit responsive to said signal from said first means for supplying said battery with a constant voltage from said d.c. power source for a predetermined period of time; and
    (d) a timer means responsive to said signal from said first means for providing said predetermined period of time to said constant-voltage charging circuit, said timer means including:
    a first comaprator responsive to said voltage and a first reference voltage;
    a capacitor responsive to said first comparator so as to be charged when said voltage is below said first reference voltage and is discharged when said voltage exceeds said first reference voltage; and
    a second comparator responsive to a voltage across said capacitor and a second reference voltage.

2. A circuit arrangement as claimed in claim 1, wherein said capacitor is connected via a first resistor to an output terminal of said first comparator so as to be charged by an output signal from said first comparator, and a second resistor is connected across said capacitor so that said capacitor is discharged via said second resistor.

3. A circuit arrangement as claimed in claim 2, further comprising a transistor for short-circuiting an output signal from a differential amplifier when said voltage of said battery is below a predetermined value.

4. A circuit arrangement as claimed in claim 1, wherein said capacitor is arranged to be forcibly charged by way of a charging circuit so that said capacitor is charged fully at the beginning of battery charging operation irrespective of the state of the battery to be charged.

5. A circuit arrangement as claimed in claim 1, wherein said second reference voltage is produced by a voltage divider including a heat-sensitive resistor placed so as to detect the temperature of said battery.

6. A circuit arrangement as claimed in claim 1, wherein said second reference voltage is produced by a circuit responsive to the voltage of said battery so that said second reference voltage varies in accordance with the charging state of said battery thereby restarting constant-voltage charging after performing of the same when the voltage of said battery is below a voltage across said capacitor.

7. A circuit arrangement as claimed in claim 6, wherein said circuit for producing said second reference voltage comprises a semiconductor element connected in series with a resistor between positive and negative terminals of said battery.

8. A circuit arrangement for rapidly charging a battery, comprising:
    (a) first means for detecting the voltage of said battery to be charged and producing a signal indicating the relationship between said voltage and a predetermined voltage, said first means including:
a voltage divider responsive to said voltage from said battery;
a reference voltage source; and
a differential amplifier responsive to a voltage from said voltage divider and a reference voltage from said reference voltage source;
(b) a constant-current charging circuit responsive to said signal from said first means for supplying said battery with a constant-current from a d.c. power source until said voltage reaches said predetermined voltage, said constant-current charging circuit including a power transistor coupled with another transistor so as to form a constant-current circuit which is connected between said d.c. power source and said battery;
(c) a constant-voltage charging circuit responsive to said signal from said first means for supplying said battery with a constant voltage from said d.c. power source for a predetermined period of time, said constant-voltage charging circuit including a transistor responsive to an output signal from said differential amplifier for controlling base bias of said power transistor; and
(d) a timer means responsive to said signal from said first means for providing said predetermined period of time to said constant-voltage charging circuit.

9. A circuit arrangement for rapidly charging a battery, comprising:
(a) first means for detecting the voltage of said battery to be charged and producing a signal indicating the relationship between said voltage and a predetermined voltage, said first means including:
a voltage divider responsive to said voltage from said battery, said voltage divider having a heat-sensitive resistor positioned so as to receive heat from said battery and heat from parts constituting said circuit arrangement;
a reference voltage source; and
a differential amplifier responsive to a voltage from said voltage divider and a reference voltage from said reference voltage source;
(b) a constant-current charging circuit responsive to said signal from said first means for supplying said battery with a constant-current from a d.c. power source until said voltage reaches said predetermined voltage;
(c) a constant-voltage charging circuit responsive to said signal from said first means for supplying said battery with a constant voltage from said d.c. power source for a predetermined period of time; and
(d) a timer means responsive to said signal from said first means for providing said predetermined period of time to said constant-voltage charging circuit.

10. A circuit arrangement for rapidly charging a battery, comprising:
(a) first means for detecting the voltage of said battery to be charged and producing a signal indicating the relationship between said votlage and a predetermined voltage;
(b) a constant-current charging circuit responsive to said signal from said first means for supplying said battery with a constant-current from a d.c. power source until said voltage reaches said predetermined voltage;
(c) a constant-voltage charging circuit responsive to said signal from said first means for supplying said battery with a constant voltage from said d.c. power source for a predetermined period of time;
(d) a timer means responsive to said signal from said first means for providing said predetermined period of time to said constant-votlage charging circuit; and
(e) a switching element interposed between said battery and a power supply line of said circuit arrangement, said switching element being responsive to power from said d.c. power source so as to be open on failure of said d.c. power source thereby preventing said battery from discharging through said circuit arrangement.

11. A circuit arrangement for rapidly charging a battery, comrpising:
(a) first means for detecting the voltage of said battery to be charged and producing a signal indicating the relationship between said voltage and a predetermined voltage;
(b) a constant-current charging circuit responsive to said signal from said first means for supplying said battery with a constant-current from a d.c. power source until said voltage reaches said predetermined voltage, said d.c. power source including:
a transformer for reducing an a.c. voltage;
a first rectifying circuit responsive to an a.c. voltage from said transformer functioning as said d.c. power source;
a second rectifying circuit responsive to said a.c. voltage from said transformer for supplying d.c. power to said circuit arrangement;
first and second capacitors respectively connected to said first and second rectifying circuits to be respectively charged; and
an indicating means responsive to the difference between voltages across said first and second capacitors for indicating that the voltage of said battery is below or above a predetermined voltage;
(c) a constant-voltage charging circuit responsive to said signal from said first means for supplying said battery with a constant coltage from said d.c. power source for a predetermined period of time; and
(d) a timer means responsive to said signal from said first means for providing said predetermined period of time to said constant-voltage charging circuit.

12. A circuit arrangement for rapidly charging a battery, comprising:
(a) first means for detecting the voltage of said battery to be charged and producing a signal indicating the relationship between said voltage and a predetermined voltage;
(b) a constant-current charging circuit responsive to said signal from said first means for supplying said battery with a constant-current from a d.c. power source until said voltage reaches said predetermined voltage;
(c) a constant-voltage charging circuit responsive to said signal from said first means for supplying said battery with a constant voltage from said d.c. power source for a predetermined period of time;

(d) a timer means responsive to said signal from said first means for providing said predetermined period of time to said constant-voltage charging circuit; and
(e) a heat-sensitive switch positioned so as to be responsive to the temperature at the bottom of said battery, said switch being connected in series with said battery so as to interrupt charging when the temperature of said battery abnormally rises.

* * * * *